(12) United States Patent
Wong

(10) Patent No.: US 11,822,625 B2
(45) Date of Patent: Nov. 21, 2023

(54) SYSTEMS, METHODS, AND APPARATUSES FOR LICENSING AND PROVISIONING A SOFTWARE PRODUCT WITHIN A CLOUD BASED COMPUTING ENVIRONMENT

(71) Applicant: Salesforce, Inc., San Francisco, CA (US)

(72) Inventor: Belinda Y. Wong, San Bruno, CA (US)

(73) Assignee: Salesforce, Inc., San Francisco, CA (US)

( * ) Notice: Subject to any disclaimer, the term of this patent is extended or adjusted under 35 U.S.C. 154(b) by 188 days.

(21) Appl. No.: 16/778,763

(22) Filed: Jan. 31, 2020

(65) Prior Publication Data
US 2021/0240799 A1 Aug. 5, 2021

(51) Int. Cl.
*G06F 21/10* (2013.01)

(52) U.S. Cl.
CPC .................. *G06F 21/105* (2013.01)

(58) Field of Classification Search
None
See application file for complete search history.

(56) References Cited

U.S. PATENT DOCUMENTS

| | | | | |
|---|---|---|---|---|
| 5,260,999 | A * | 11/1993 | Wyman | G06F 21/121 705/59 |
| 6,189,146 | B1 * | 2/2001 | Misra | G06Q 30/06 717/177 |
| 9,129,095 | B1 * | 9/2015 | Lam | H04L 63/061 |
| 10,885,135 | B1 * | 1/2021 | O'Brien | G06F 16/9035 |
| 2002/0107809 | A1 * | 8/2002 | Biddle | G06F 21/105 705/59 |
| 2002/0138441 | A1 * | 9/2002 | Lopatic | G06F 21/125 705/59 |
| 2012/0159611 | A1 * | 6/2012 | Stearns | G06F 21/105 726/18 |
| 2012/0166300 | A1 * | 6/2012 | Marsano | G06F 21/105 705/26.1 |
| 2014/0032764 | A1 * | 1/2014 | Akolkar | G06F 9/5072 709/226 |
| 2014/0282358 | A1 * | 9/2014 | Mowatt | G06F 8/70 717/104 |

(Continued)

FOREIGN PATENT DOCUMENTS

WO WO-0129728 A1 * 4/2001 ........... G06F 21/105

*Primary Examiner* — Jacob C. Coppola
(74) *Attorney, Agent, or Firm* — Polygon IP, LLP

(57) ABSTRACT

Systems, methods, and apparatuses for implementing licensing and provisioning software products within a cloud based computing environment. An exemplary system having at least a processor and a memory therein includes logic for receiving user input defining a plurality of features of a software product, creating a license definition of the software product based on one or more of the plurality of software product features, storing the license definition into a software application depot hosted by a cloud computing service provider, publishing a record for the license definition in a selected management organization for the cloud computing service provider, the record providing a reference to the license definition and an owner thereof, and assigning and linking a stock keeping unit (SKU) to the license definition to make the software product available for purchase.

18 Claims, 20 Drawing Sheets

(56) References Cited

U.S. PATENT DOCUMENTS

| | | | |
|---|---|---|---|
| 2014/0282398 A1* | 9/2014 | Podolyak | G06F 8/36 |
| | | | 717/121 |
| 2019/0384624 A1* | 12/2019 | Jamkhedkar | G06F 9/45558 |
| 2020/0225942 A1* | 7/2020 | Oberhofer | G06F 8/75 |
| 2021/0192013 A1* | 6/2021 | Karappa | G06F 21/105 |

* cited by examiner

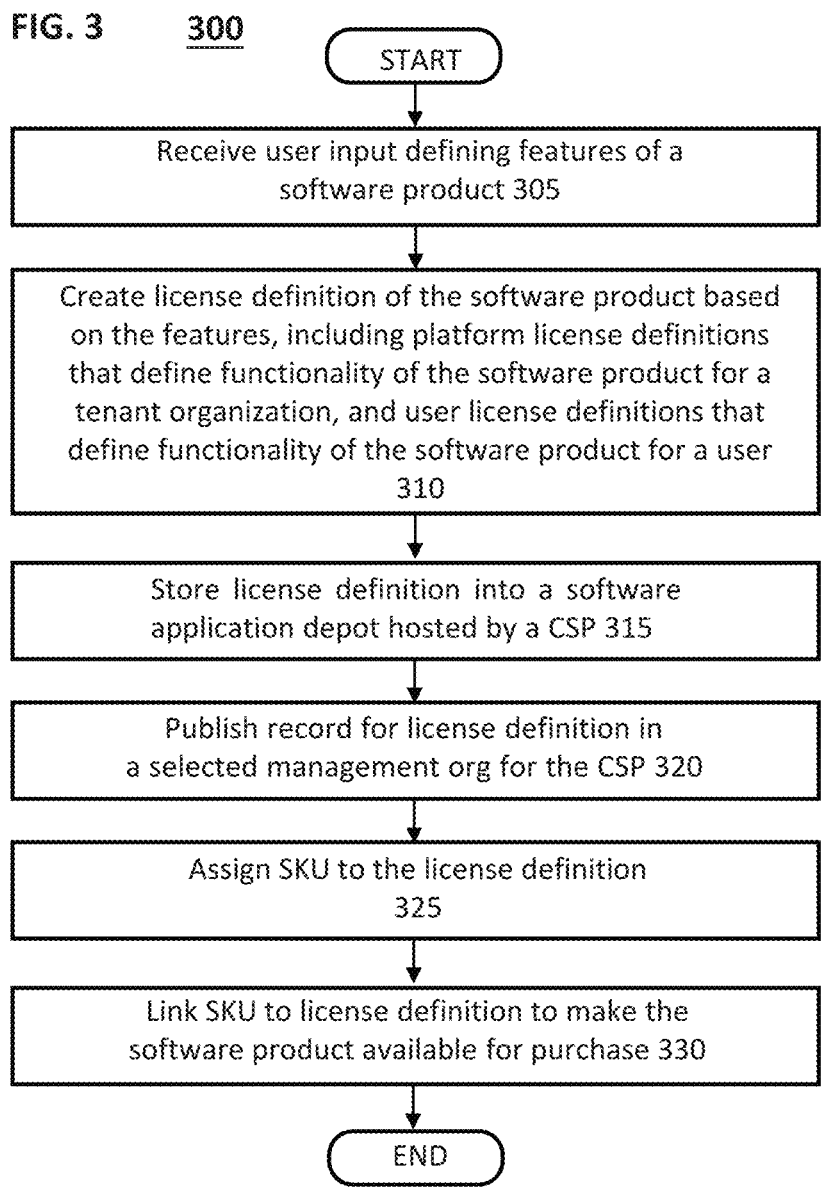

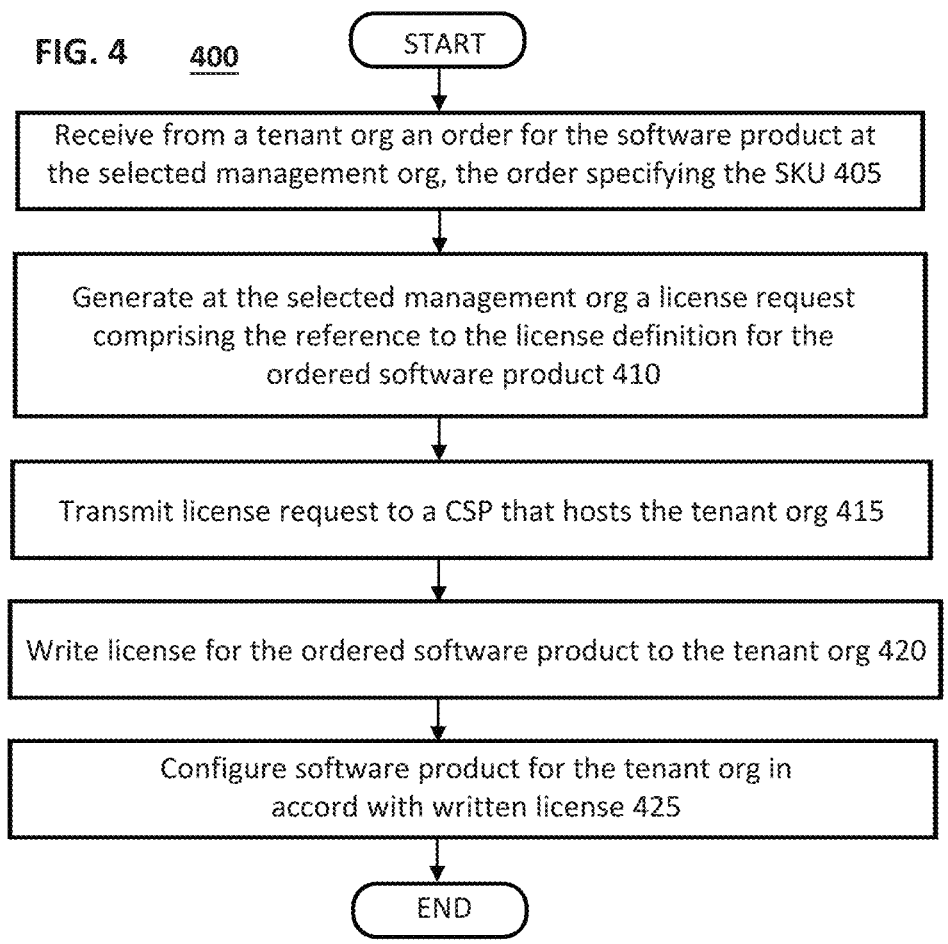

```
<UserLicenseDefinition>
    <fullName>QuipUser-1</fullName>
    <name>Quip User</name>
    <cloudServiceProvider>quip</cloudServiceProvider>
    <licenseKey>QuipUser</licenseKey>
    <minPlatformVersion>206</minPlatformVersion>
    <settingItems>
        <durableId>setting/quip/Seats</durableId>
  <value>1</value>
    </settingItems>
</UserLicenseDefinition>
```

FIG. 5

```
<EditionDefinition>
<fullName>QuipBusiness-1</fullName>
    <name>Quip Business</name>
    <defaultStatus>Active</defaultStatus>
    <managementTenantId>00D000000000062</managementTenantId>
    <managementServiceProvider>force.com</managementServiceProvider>
    <cloudServiceProvider>quip</cloudServiceProvider>
    <includedUserLicenseDefinitions>
        <fullName>QuipUser-1</fullName>
        <name>Quip User</name>
        <quantity>1</quantity>
    </includedUserLicenseDefinitions>
</EditionDefinition>
```

FIG. 6

```
EXAMPLE 1:
<settingItems>
    <durableId>userSetting.DataStoragePerLicense</dur
    ableId>
    <value>20</value>
</settingItems>

EXAMPLE 2: <settingItems>
    <durableId>userSetting.DefaultTabSet</durableId>
    <editable>true</editable>
<value>AllTabSet</value> </
settingItems>
```

FIG. 8

```
<?xml version='1.0' encoding='UTF-8'?>
<PlatformLicenseDefinition>
    <fullName>HerokuScalableDynoHours1-1</fullName>
    <name>HerokuScalableDynoHours1</name>
    <cloudServiceProvider>heroku</cloudServiceProvide
    r>
    <minPlatformVersion>180</minPlatformVersion>
</PlatformLicenseDefinition>
```

FIG. 9A

```xml
<?xml version='1.0' encoding='UTF-8'?>
<PlatformLicenseDefinition>
    <fullName>Radian6Mentions1-1</fullName>
    <name>Radian6Mentions1</name>
    <cloudServiceProvider>radian6</cloudServiceProvider>
    <minPlatformVersion>178</minPlatformVersion>
    <settingItems>
        <durableId>setting/radian6/Mentions</durableId>
        <value>1</value>
    </settingItems>
    <settingUsageDefinitions>
        <setting>setting/radian6/Mentions</setting>
        <isPersistentResource>true</isPersistentResource>
        <frequencyDefault>Monthly</frequencyDefault>
        <overageGraceDefault>100.00</overageGraceDefault>
    </settingUsageDefinitions>
</PlatformLicenseDefinition>
```

FIG. 9B

```xml
<?xml version='1.0' encoding='UTF-8'?>
<PlatformLicenseDefinition>
    <fullName>CustomBigObjects-1</fullName>
    <name>CustomBigObjects</name>
    <cloudServiceProvider>force.com</cloudServiceProvider>
    <minPlatformVersion>210</minPlatformVersion>
    <settingItems>
        <durableId>orgPermission.PlinyCustomObjects</durableId>
        <value>true</value>
    </settingItems>
    <settingItems>
        <durableId>orgValue.MaxCustomBigObjectsRows</durableId>
        <ignoreQuantity>true</ignoreQuantity>
        <value>500000</value>
    </settingItems>
    <settingUsageDefinitions>
        <setting>setting/force.com/orgValue.MaxCustomBigObjectsRows</setting>
        <isPersistentResource>true</isPersistentResource>
        <frequencyDefault>Once</frequencyDefault>
        <overageGraceDefault>100.00</overageGraceDefault>
    </settingUsageDefinitions>
</PlatformLicenseDefinition>
```

FIG. 9C

```xml
<?xml version="1.0" encoding="UTF-8"?>
<UserLicenseDefinition>
    <fullName>ChatterFree5000Seats-1</fullName>
    <name>ChatterFree5000Seats</name>
    <cloudServiceProvider>force.com</cloudServiceProvider>
    <licenseKey>CSN_User</licenseKey>
    <minPlatformVersion>174</minPlatformVersion>
    <settingItems>
        <durableId>userSetting.Seats</durableId>
        <value>5000</value>
        <ignoreQuantity>true</ignoreQuantity>
    </settingItems>
</UserLicenseDefinition>
```

FIG. 10A

```xml
<?xml version="1.0" encoding="UTF-8"?>
<UserLicenseDefinition>
    <fullName>Radian6PlatformUsers1-1</fullName>
    <name>Radian6PlatformUsers1</name>
    <cloudServiceProvider>radian6</cloudServiceProvider>
    <licenseKey>PlatformUser</licenseKey>
    <minPlatformVersion>178</minPlatformVersion>
    <settingItems>
        <durableId>setting/radian6/Seats</durableId>
    <value>1</value>
    </settingItems>
    <settingUsageDefinitions>
        <setting>setting/radian6/Seats</setting>
        <isPersistentResource>true</isPersistentResource>
        <frequencyDefault>Monthly</frequencyDefault>
        <overageGraceDefault>100.00</overageGraceDefault>
    </settingUsageDefinitions>
</UserLicenseDefinition>
```

FIG. 10B

```xml
<?xml version="1.0" encoding="UTF-8"?>
<EditionDefinition>
    <fullName>EnterpriseEdition-1</fullName>
    <name>EnterpriseEdition</name>
    <defaultStatus>Active</defaultStatus>
    <managementTenantId>00D000000000062</managementTenantId>
    <managementServiceProvider>force.com</managementServiceProvider>
    <cloudServiceProvider>force.com</cloudServiceProvider>
    <includedPlatformLicenseDefinitions>
        <fullName>EnterpriseEdition-1</fullName>
        <name>EnterpriseEdition</name>
        <quantity>1</quantity>
    </includedPlatformLicenseDefinitions>
    <includedPlatformLicenseDefinitions>
        <fullName>CustomBigObjects-1</fullName>
        <name>CustomBigObjects</name>
        <quantity>1</quantity>
    </includedPlatformLicenseDefinitions>
    <includedUserLicenseDefinitions>
        <fullName>FullCRM-1</fullName>
        <name>FullCRM</name>
        <quantity>1</quantity>
    </includedUserLicenseDefinitions>
```

FIG. 11A

```xml
<includedUserLicenseDefinitions>
    <fullName>ChatterFree-1</fullName>
    <name>ChatterFree</name>
    <quantity>1</quantity>
</includedUserLicenseDefinitions>
<includedUserLicenseDefinitions>
    <fullName>ChatterFree5000Seats-1</fullName>
    <name>ChatterFree</name>
    <quantity>1</quantity>
</includedUserLicenseDefinitions>
<includedUserLicenseDefinitions>
    <fullName>ChatterExternal-1</fullName>
    <name>ChatterExternal</name>
    <quantity>1</quantity>
</includedUserLicenseDefinitions>
<includedUserLicenseDefinitions>
    <fullName>ChatterExternal500Seats-1</fullName>
    <name>ChatterExternal500Seats</name>
    <quantity>1</quantity>
</includedUserLicenseDefinitions>
<includedUserLicenseDefinitions>
    <fullName>GuestUserLicense-1</fullName>
    <name>GuestUserLicense</name>
    <quantity>1</quantity>
</includedUserLicenseDefinitions>
<includedUserLicenseDefinitions>
    <fullName>GuestUserLicense1SeatOnly-1</fullName>
    <name>GuestUserLicense1SeatOnly</name>
    <quantity>1</quantity>
</includedUserLicenseDefinitions>
</EditionDefinition>
```

FIG. 11B

```
<?xml version='1.0' encoding='UTF-8'?>
<PlatformLicenseDefinition>
    <fullName>Radian6Mentions1-1</fullName>
    <name>Radian6Mentions1</name>
    <cloudServiceProvider>radian6</cloudServiceProvid
    er>
    <minPlatformVersion>178</minPlatformVersion>
    <settingItems>
        <durableId>setting/radian6/Mentions</durableI
        d>
        <value>1</value>
    </settingItems>
    <settingUsageDefinitions>
        <setting>setting/radian6/Mentions</setting>
        <isPersistentResource>true</isPersistentResou
        rce>
        <frequencyDefault>Monthly</frequencyDefault>
        <overageGraceDefault>100.00</overageGraceDefa
        ult>
    </settingUsageDefinitions>
</PlatformLicenseDefinition>
```

FIG. 12

```
<settingItems>
    <durableId>userPermission.ActivateContract</durab
    leId>
    <editable>true</editable>
    <value>false</value>
</settingItems>
<settingItems>
    <durableId>userPermission.ActivitiesAccess</durab
    leId>
    <value>true</value>
</settingItems>
<settingItems>
    <durableId>userPermission.AddDirectMessageMembers
    </durableId>
    <editable>true</editable>
    <value>true</value>
</settingItems>
```

FIG. 13A

```
<standardPermissionSets>
    <developerName>Admin</developerName>
    <profileKey>Admin</profileKey>
    <settingValues>
        <durableId>userPermission.ActivateContract</d
        urableId>
        <value>true</value>
    </settingValues>
```

FIG. 13B

```
    <settingItems>
        <durableId>orgPreference.AccessCheckCrucPref</dur
        ableId>
        <editable>true</editable>
        <value>false</value>
    </settingItems>
    <settingItems>
        <durableId>orgPreference.AccountExportButtonOff</
        durableId>
        <editable>true</editable>
        <value>false</value>
    </settingItems>
      <settingItems>
        <durableId>orgPreference.AMCToggleOn</durableId>
        <editable>true</editable>
        <value>false</value>
    </settingItems>
    <settingItems>
        <durableId>orgPreference.APILoginRequiresOrgDomai
        n</durableId>
        <editable>true</editable>
        <value>false</value>
    </settingItems>
    <settingItems>
```

FIG. 14

```
<UsageDataExchange>
   <usageData type="UsageEntitlementUsage">
   <setting>setting/radian6/Mentions</setting>
   <amount>1000</amount>
   <startDateTime>2017-09-
   28T21:24:14.194+0000</startDateTime>
   <endDateTime>2017-09-
   30T18:48:32.194+0000</endDateTime>
   <resourceGroupKey>(tenant)</resourceGroupKey>
  </usageData>
</UsageDataExchange>
```

FIG. 16

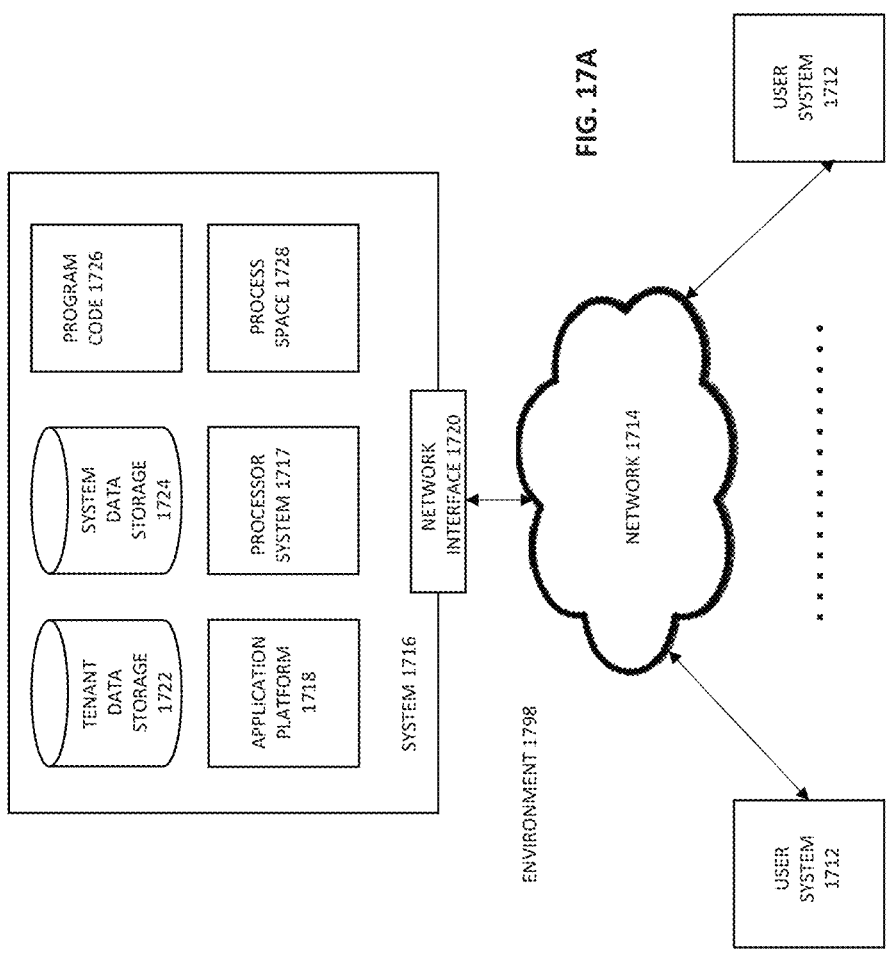

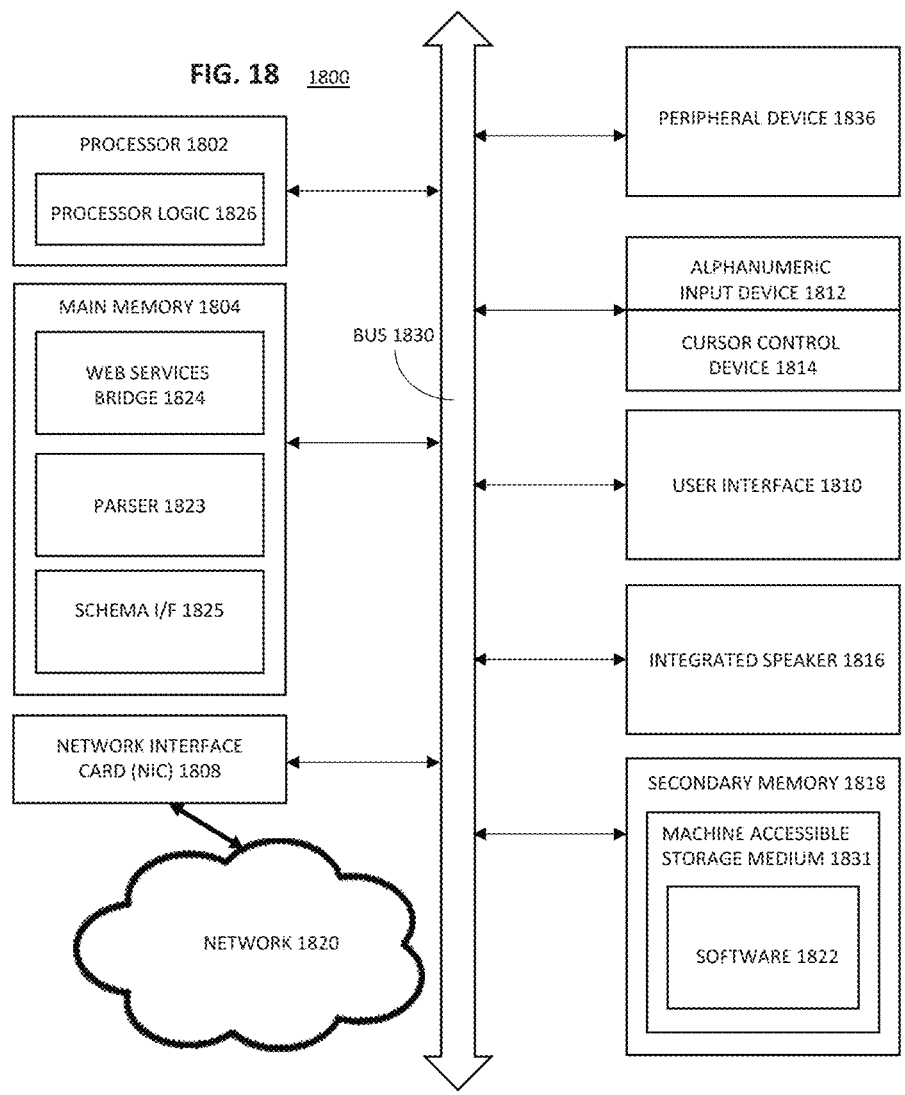

SYSTEMS, METHODS, AND APPARATUSES FOR LICENSING AND PROVISIONING A SOFTWARE PRODUCT WITHIN A CLOUD BASED COMPUTING ENVIRONMENT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for licensing and provisioning software products within a cloud based computing environment. Such embodiments may be implemented within the computing architecture of a hosted computing environment, such as an on-demand or cloud-computing environment that utilizes multi-tenant database technologies, client-server technologies, traditional database technologies, or other computing architecture in support of the hosted computing environment.

BACKGROUND

The subject matter discussed in this background section should not necessarily be construed as prior art merely because of its mention in this section. Similarly, a problem mentioned in this section or associated with the subject matter of this section should not be construed as being previously recognized in the prior art. The subject matter in this section merely represents different approaches, which in and of themselves may also correspond to claimed embodiments.

Cloud service providers (CSP) provide for licensing and provisioning software products to tenants (i.e., organizations, or "orgs") of the cloud service provider, wherein the management organization of the cloud service provider performs the licensing and provisioning. What is needed is a way to provide such licensing and provisioning from any designated or selected management organization to any tenant, whether such the tenant subscribes to the services of the cloud service provider, or subscribes to third party cloud services provider that is coupled in communication with the cloud services provider, whether integrated under the cloud services provider or not.

BRIEF DESCRIPTION OF THE DRAWINGS

Embodiments are illustrated by way of example, and not by way of limitation, and will be more fully understood with reference to the following detailed description when considered in connection with the figures in which:

FIG. 3 depicts a flow diagram illustrating a method for implementing licensing a software product within a cloud based computing environment in accordance with disclosed embodiments;

FIG. 4 depicts a flow diagram illustrating a method for implementing provisioning of a licensed software product within a cloud based computing environment in accordance with disclosed embodiments;

FIG. 5 is an example of a simple user license definition for Quip (a content collaboration platform) with just one setting (settingItems) for Seats in accordance with disclosed embodiments;

FIG. 6 is an example of a user license definition for Quip Business Edition (a type of product license definition) in accordance with disclosed embodiments;

FIG. 8 show two user settings from a standard Salesforce User License in accordance with disclosed embodiments;

FIG. 9A is an example platform license definition for Custom Big Objects on the Force.com platform, with settings for PlinyCustomObjects and MaxCustomBigObjectRows, in accordance with disclosed embodiments;

FIG. 9B is an example of a platform license definition for Heroku Scalable Dyno Hours in accordance with disclosed embodiments;

FIG. 9C is an example of a platform license definition for Radian6 Mentions, in accordance with disclosed embodiments;

FIG. 10A is an example of a user license definition for Chatter Free 5000 from Force.com, in accordance with disclosed embodiments;

FIG. 10B is an example of a user license definition for Radian6 Platform Users from Radian6, with one setting for Seats in accordance with disclosed embodiments;

FIG. 11A is edition license definitions (.edn.xml files) from Force.com in accordance with disclosed embodiments;

FIG. 11B is edition license definitions (.edn.xml files) from Force.com in accordance with disclosed embodiments;

FIG. 12 is an example of the Radian6 Mentions platform license which includes usage definitions for the setting/radian6/Mentions setting in accordance with disclosed embodiments;

FIG. 13A provides a section of the standard Salesforce User License definition for Force.com in accordance with disclosed embodiments;

FIG. 13B provides a section of the Admin profile in accordance with disclosed embodiments;

FIG. 14 provides examples of a few preferences in the Enterprise Edition platform license definition for Force.com in accordance with disclosed embodiments;

FIG. 16 shows an XML request with usage data for Radian6 Mentions in accordance with disclosed embodiments;

FIG. 17A illustrates a block diagram of an environment in which an on-demand database service may operate in accordance with the described embodiments;

FIG. 18 illustrates a diagrammatic representation of a machine in the exemplary form of a computer system, in accordance with one embodiment.

DETAILED DESCRIPTION

Figure 1:
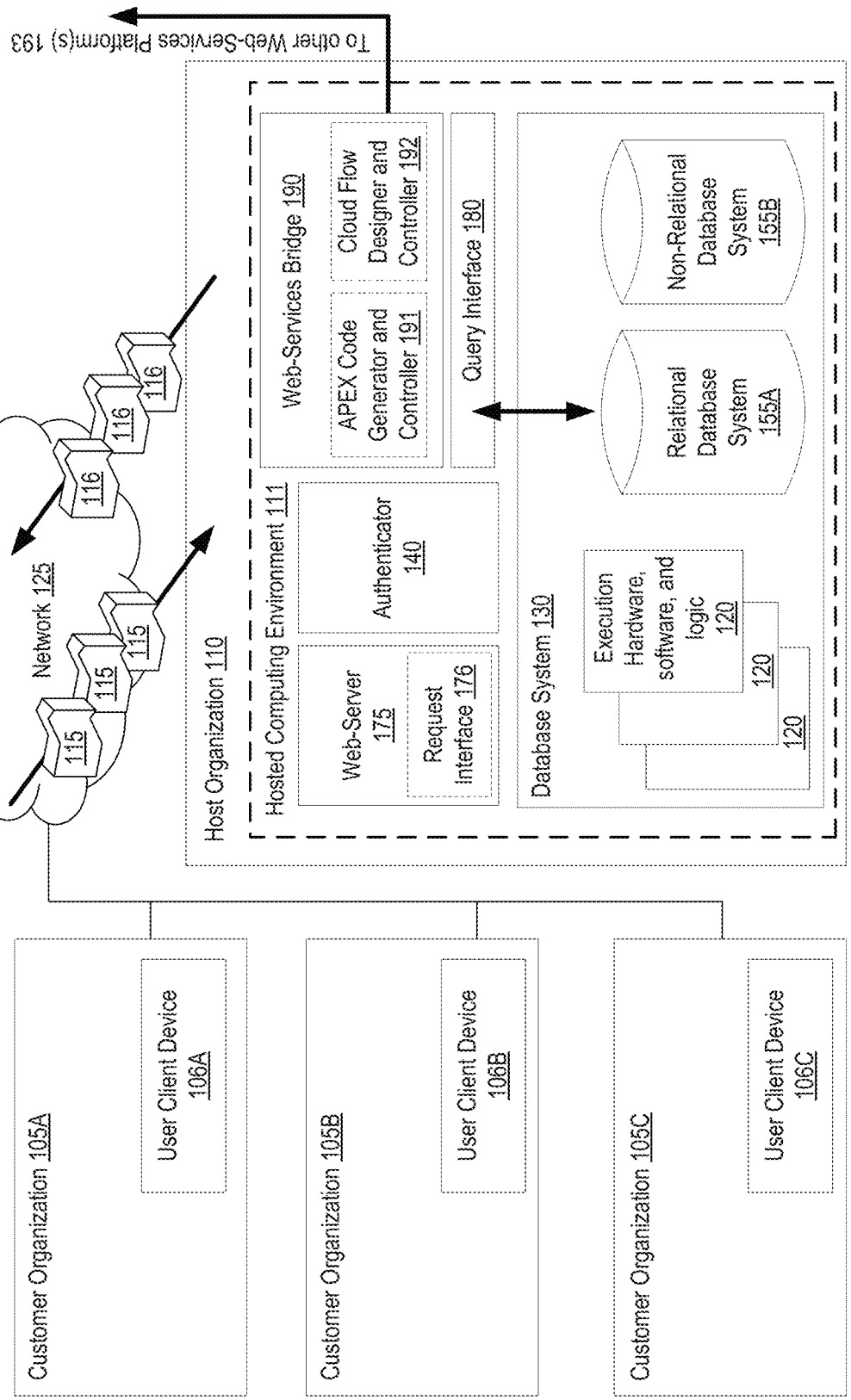
FIG. 1 depicts an exemplary architecture in accordance with described embodiments.

Described herein are systems, methods, and apparatuses for licensing and provisioning software products within a cloud based computing environment. For instance, such an exemplary system having a processor and a memory therein includes logic for receiving user input defining a plurality of features of a software product, creating a license definition of the software product based on one or more of the plurality of software product features, storing the license definition into a software application depot hosted by a cloud computing service provider, publishing a record for the license definition in a selected management organization for the cloud computing service provider, the record providing a reference to the license definition and an owner thereof, and assigning and linking a stock keeping unit (SKU) to the license definition to make the software product available for purchase.

Additional logic involves receiving from a tenant organization an order for the software product at the selected management organization, the order specifying the SKU, generating at the selected management organization a license request comprising the reference to the license definition for the ordered software product, transmitting the license request to a cloud service provider that hosts the tenant organization, writing a license for the ordered software product to the tenant organization, and configuring the software product for the tenant organization in accordance with the written license.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods are described in detail in order to avoid unnecessarily obscuring the disclosed embodiments.

In addition to various hardware components depicted in the figures and described herein, embodiments further include various operations that are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated, configured, or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems appears as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other programmable electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records with user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

Certain embodiments may utilize a client-server computing architecture to supplement features, functionality, or computing resources for the database system 130 or alternatively, a computing grid, or a pool of work servers, or some combination of hosted computing architectures may be utilized to carry out the computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface. The hardware, software, and logic elements 120 of the database system 130 are separate and distinct from a plurality of customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

The query interface 180 is capable of receiving and executing requested queries against the databases and storage components of the database system 130 so as to return a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C.

Authenticator 140 operates on behalf of the host organization to verify, authenticate, and otherwise credential users attempting to gain access to the host organization.

Still further depicted within the hosted computing environment 111 is the web-services bridge 190 having therein both a code generator and controller 191 and also a cloud flow designer and controller 192 capable of communicating with other web-services platform(s) 193 which regardless of whether such web-services platforms are hosted by the same host organizations 110 or hosted by different host organizations.

Overview of Licensing and Provisioning

Introduction

Licensing and provisioning is the process of declaring product functionality in metadata, enabling products for customer organizations (tenants), and enabling revenue recognition from customer purchases. Licensing and provisioning is conducted in two stages, according to embodiments of the invention.

Licensing is the first stage of the process and involves declaring products to make them available for customers to purchase through a cloud services provider's infrastructure, e.g., the Salesforce cloud infrastructure. Developers create licenses with metadata that describes product functionality.

Provisioning is the second stage of the process and involves fulfilling customer orders, enabling product functionality for customers, and enabling the cloud services provider to recognize revenue. Most of the provisioning process is performed by an automated provisioning system that uses Application Programmatic Interfaces (APIs) to deliver license data to customers.

For the purposes of licensing and provisioning, a software product is an item, identified by a SKU, that a customer purchases. A feature is some aspect of the functionality that the software product provides.

Cloud Services Provider Cloud Infrastructure Overview

A cloud service provider's (CSP's) cloud infrastructure may include multiple integrated cloud service providers (CSPs), technology stacks that provide application servers, a database, and other infrastructure to develop and run applications and store customer data. The cloud infrastructure is hosted on servers in data centers distributed across a large geographical area, perhaps the entire globe.

According to one embodiment, the CSP is the Force.com CSP, which is the foundation of the Salesforce cloud infrastructure and Salesforce products and services. Force.com powers the standard Salesforce Customer Relationship Management (CRM) applications such as Sales Cloud and Service Cloud, custom applications built by Salesforce CRM customers, and applications on AppExchange created by independent software vendors (ISVs). In an alternative embodiment, another CSP that provides CRM and custom applications may be used. In any case, the CSP uses APIs to communicate with other CSPs in the CSP's cloud, to provide infrastructure and application management functionality. According to one embodiment, Force.com hosts the technology that manages the licensing and provisioning process for all products on all CSPs in Salesforce.

CSPs such as Force.com uses a multitenant architecture, a fundamental technology at the core of all CSPs, to share infrastructure and resources among multiple applications and customers while providing each customer with secure, private access and control over their own data. For example, the Force.com platform uses metadata to define multitenancy at the software level. This software-based multitenancy can serve multiple customers more efficiently than multitenancy that uses virtual machines or software containers at the level of the operating system. Force.com runs a single database schema that is common to all customers.

CSPs such as the Force.com CSP use metadata to define the configuration, capabilities, appearance, and other aspects of applications and database objects, and to deploy applications and data at runtime. This metadata-driven architecture separates the database schema, the customer data, and the metadata that describes each application. Metadata on Force.com is defined in the Universal Data Dictionary (UDD), a central repository that represents the database schema.

Licenses include metadata that defines product functionality, appearance, and so on. The provisioning system described herein below uses the license metadata to enable the functionality for the tenant (customer organization). All product metadata is defined in the UDD, in order for the product to be provisioned.

A CSP cloud infrastructure includes a number of CSPs that run on technology stacks separate from the CSP. For example, the Salesforce cloud infrastructure includes a number of CSPs that run on technology stacks separate from Force.com. These CSPs may be integrated with the CSP platform (e.g., Force.com platform) via APIs, and can take advantage of the multitenant, metadata-driven architecture of the CSP in delivering their own functionality. In one embodiment, the CSP platform (e.g., Force.com) is a hub that connects with all other CSPs in the CSP's cloud. The other CSPs do not connect directly with one another. Technology on the CSP platform manages licensing and provisioning for all products on all CSPs.

In the CSP cloud, a customer is constituted as a collection of data and metadata called a tenant. A tenant is hosted on the CSP that provides the service the customer has contracted for. So, a customer using the Salesforce Sales Cloud has a tenant on Force.com, a customer using Heroku Dynos (Linux containers) has a tenant on Heroku, and so on. CSPs use different names to refer to tenants. On Force.com, a tenant is called an organization, a customer organization, or an "org".

A tenant is a secure container. Only authorized users in the customer organization can access information in the tenant. Each tenant has a unique ID, which is required to query any data associated with the org. Tenants share infrastructure and resources on their respective host CSPs and in the CSP cloud, but cannot access one another's data. An administrator (admin) in a customer organization assigns user permissions and oversees customization of the applications and services in the tenant.

Different CSPs use different processes to create tenants. On Force.com and some other CSPs, a customer's tenant is created during trial signup (when the customer receives free, limited-time access to a product before making a purchase). Some CSPs create tenants "on the fly", during provisioning. Additionally, a tenant may be created manually by an administrator.

Using a CSP in the Salesforce cloud as an example, one can think of a CSP as an office building, and tenants as tenants occupying offices. The building provides infrastructure and services that make the space operable and protect each tenant's privacy. All tenants use the shared infrastructure, but each tenant controls access to their own offices and no one can go into any office without authorization. Just like a company can have office space in more than one building, a customer can have tenants on more than one CSP in the Salesforce cloud. If a customer uses both the Sales Cloud and Heroku Dynos, they will have two separate tenants, one on Force.com and one on Heroku, with separate tenant IDs.

A CSP operates its own tenant, or organization, or "org" to provide management functions for other tenants (customer organizations, or customer orgs). For example, Salesforce operates its own management organization, called Org 62, which is hosted on Force.com and communicates with CSPs in the cloud via APIs to implement a variety of management functions. In one embodiment, Org 62 performs licensing and provisioning operations for all tenants on all CSPs in the cloud. Alternatively, a different tenant (e.g., a management organization, or management org other than Org 62) may be configured to perform licensing and provisioning operations for all tenants on all CSPs in the cloud. For example, there are other management orgs on Force.com used for testing and other purposes. In addition, independent software vendors (ISVs) on Force.com may use a License Management Application to track and manage customers on AppExchange. According to the embodiments, any such management orgs may be used for licensing and provisioning tenants in the cloud.

Returning to the office analogy, the CSP cloud is like a cluster of office towers. Each CSP is a separate tower that provides services for its own tenants, and all the towers share some infrastructure and management services. The management organization, e.g., Org 62, is the leasing agent that oversees the lease agreements for all the towers and alerts the respective building superintendent when a new tenant is moving into a tower.

Licensing and Provisioning Overview

A management organization ("management org"), such as Org 62, or another management org, is central to licensing and provisioning, so all CSPs in the cloud are configured to communicate with the management org in order to deliver software products to customers. During configuration, a record is created in the management org for the CSP, with fields for data about the CSP. Once configuration is complete, licensing and provisioning involves two separate workflows to create licenses and provision products. The information below provides an overview of how to configure a CSP to communicate with the management org, how to license software products, and how to provision software products.

Figure 2:
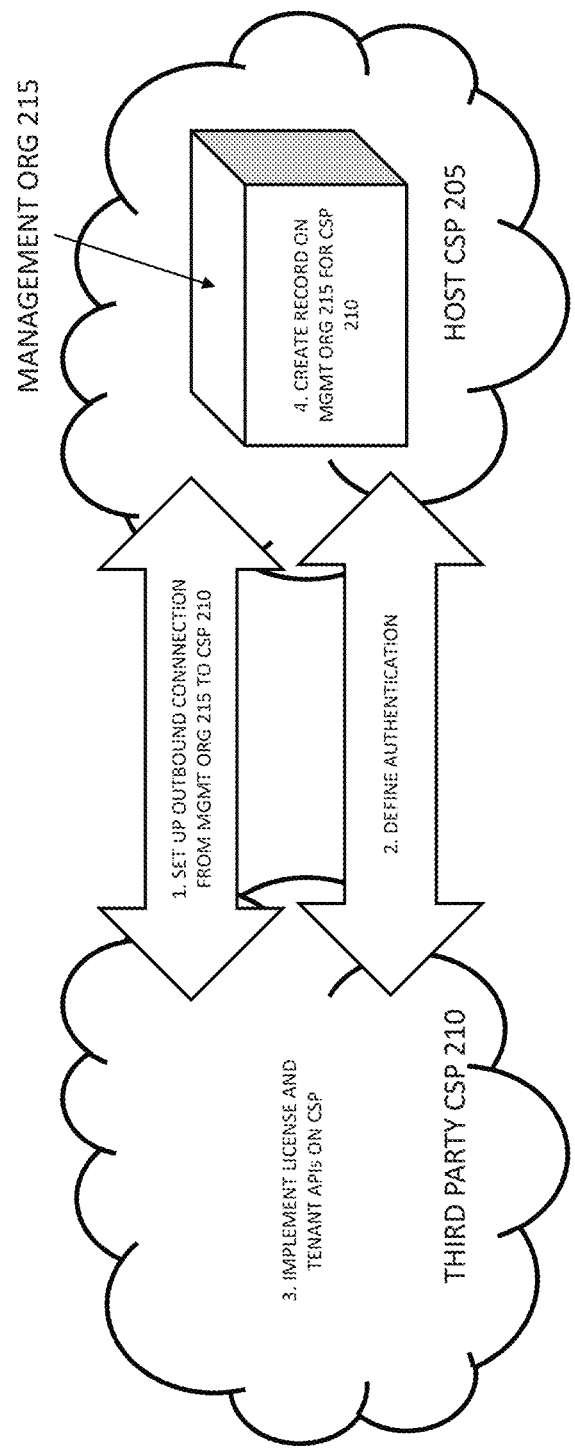
FIG. 2 illustrates that when service providers are hosted on any other CSP in the PaaS cloud, system administrators typically configure the CSP to communicate with the management org on the PaaS platform in accordance with the disclosed embodiments.

For service providers hosted on a Platform as a Service (PaaS) such as Salesforce's Force.com, configuration with a management org may be performed as part of the service provider setup. For service providers hosted on any other CSP in the PaaS cloud, system administrators typically configure the CSP to communicate with the management org on the PaaS platform, as described with reference to FIG. 2. The first step involves setting up an outbound connection between a management org 215 on CSP 205 and the other CSP 210. For CSPs using usage entitlement tracking, as described below, the connection between the management org 215 and the other CSP 210 is both outbound and inbound. The second step involves defining authentication, followed by the third step of implementing license APIs and tenant APIs on the CSP 210. Finally, at step 4, a new CSP record in the management org is created and fields in the record are filled with relevant data for CSP 210.

FIG. 3 depicts a flow diagram illustrating a method 300 for licensing and provisioning software products within a cloud based computing environment in accordance with the disclosed embodiments. Method 500 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the hosted computing environment 111, the web-services bridge 190, and its database system 130 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method of licensing, an embodiment 300 is depicted at FIG. 3, wherein, at block 305, processing logic receives user input defining a plurality of features of a software product. At block 310, processing logic creates a license definition of the software product based on one or more of the plurality of software product features. According to one embodiment, the logic for creating the license definition comprises logic to create a plurality of platform license definitions that define functionality of the software product for a tenant organization, further logic to create a plurality of user license definitions that define functionality of the software product for a user, and logic to combine one or more of the plurality of platform license definitions and one or more of the plurality of user license definitions into the license definition.

At block 315, processing logic stores the license definition into a software application depot hosted by a cloud computing service provider. At block 320, processing logic publishes a record for the license definition in a selected management organization for the cloud computing service provider, the record providing a reference to the license definition and an owner thereof. In one embodiment, the management org is the Org 62 for Force.com. In another embodiment, the management org is a different tenant org on Force.com or another CSP platform. At block 325, processing logic assigns a stock keeping unit (SKU) to the license definition, followed by processing logic at block 330 linking the stock keeping unit (SKU) to the license definition to make the software product available for purchase.

With reference to the method of provisioning, an embodiment 400 is depicted at FIG. 4, wherein, at block 405, processing logic receives from a tenant organization an order for the software product at the selected management organization, the order specifying the SKU. At block 410, processing logic then generates at the selected management organization a license request comprising the reference to the license definition for the ordered software product. At block 415, processing logic transmits the license request to a cloud service provider that hosts the tenant organization, and at block 420, processing logic writes a license for the ordered software product to the tenant organization. Finally, at block 425, processing logic configures the software product for the tenant organization in accordance with the written license.

Licensing Overview

A "license definition" is a metadata description of the functionality that is conferred by a product or feature. The license definition is an abstract definition that is true for all customers. A "license" is the contractual agreement with a specific customer. The license includes the metadata that describes functionality, as well as information specific to the customer, such as quantity and start and end dates. A similar concept is state driver's licenses: a state statute that defines the qualifications and restrictions associated with the right to drive a vehicle could be considered a driver's license definition. The laminated card issued by the state to an individual driver, with the driver's name, photo, etc., is a driver's license.

Likewise, developers create license definitions that define product functionality. During provisioning, a selected management organization, such as the Salesforce Force.com platform management organization known as Org 62, determines the licenses to which a tenant is entitled. The management org calls the host CSP and sends the entitlements for the tenant. The host CSP uses that entitlement information to determine how to configure the tenant with the product functionality. The process of creating license definitions begins once a service provider team has developed a new product. The steps below describe the basic workflow for creating license definitions for a new software product.

Feature developers configure features of the software product, for example, as settings according to one embodiment, and combine, or "bundle" the settings to create license definitions that define functionality for a tenant as a whole (platform license definitions) or for individual users (user license definitions). According to one embodiment, developers on the host CSP use metadata tools create license definitions. Developers on other CSPs (and independent software vendors on AppExchange) use product information to create settings and license definitions. The example in FIG. 5 is a simple user license definition for Quip (a content collaboration platform) with just one setting (settingItems) for Seats. The value attribute specifies the number of individual users who are authorized with this license. Note the single setting.

Developers bundle platform and user license definitions to create product license definitions, which define all the functionality in a given product. The example in FIG. 6 is for Quip Business Edition (a type of product license definition). Note that this product license definition includes the Quip User license definition, with a quantity attribute that indicates how many copies of the user license definition are included in the product license definition.

Developers check the license definitions into version control (e.g., Perforce) in the core application depot on their CSP, or, alternatively, on the host CSP, e.g., Force.com.

The host CSP creates license definition records in a management org, such as Org 62 or another management org that correspond to the license definitions in version control. In one embodiment, the license definition records in the management org on the host CSP are 'shell' references to the actual license definitions, and do not contain the complete license definition metadata. Because the developer's CSP created the license definitions, the developer's CSP has its own record of the defined functionality.

After the license definitions are checked into version control on the third party CSP and the license definition records are created in the management org on the host CSP, the host service provider assigns a SKU for the new software product. The product SKU is then linked to the product license definition, which makes the product available for purchase.

The above steps give a general overview of the licensing process, but it is understood that CSPs in the cloud can configure license definitions in different ways. For example, settings are useful for CSPs that have complex products that reuse some of the same features in multiple license definitions. For example, many Salesforce Force.com license definitions include overlapping functionality, and developers use settings to include the same functionality in multiple license definitions. Conversely, Heroku license definitions do not include settings. Each Heroku license definition describes unique functionality, and the license definition alone is sufficient to define product enablement.

Provisioning Overview

Provisioning is the process of fulfilling a customer order for a software product, enabling product functionality in a tenant, and, according to one embodiment, enabling the process of recognizing revenue from the purchase. The provisioning system uses references to license definitions to direct the host CSPs to write licenses to customer tenants and configure the tenants with product functionality.

The steps that follow generally describe the provisioning process. A customer places an order through a sales representative or through an application exchange, such Salesforce's AppExchange. The order is activated, which pushes the customer account into the automated provisioning queue on the host CSP's designated or selected management org, e.g., the Force.com Org 62. The provisioning system on the selected management org on host CSP creates a license request that includes the license definition records (references to the actual license definitions) for the software product(s) in the order.

The selected management org then sends the license request via an API call to the third party CSP where the customer tenant is hosted (either Force.com or another CSP). The host CSP receives the API call from the selected management org, writes licenses to the tenant for the products in the order, and configures the tenant with the functionality defined by the license. If the provisioning is successful, the host CSP returns the status "Success", according to an embodiment. The selected management org updates the tenant record to change the order status to "Provisioned", and enables the host CSP to recognize revenue for the customer order.

Figure 7:
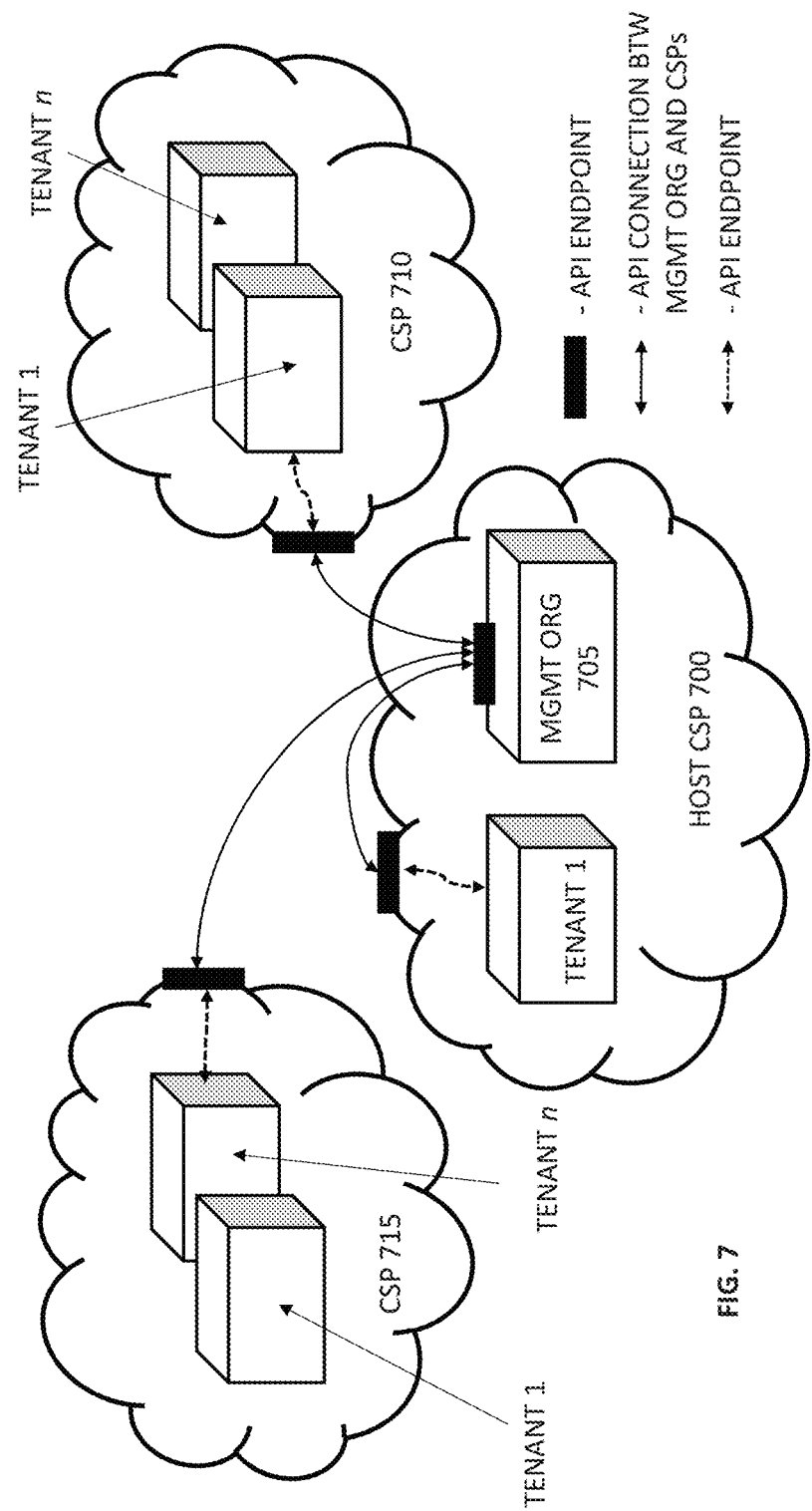
FIG. 7 shows the relationship between a management org and tenants on several other CSPs in accordance with disclosed embodiments.

FIG. 7 shows the relationship between the management org 705 (e.g., Org 62 or another selected management organization) on the host CSP 700 and tenants on several other CSPs 710 and 715. Management org 705 connects to a CSP 710, 715 via API calls to send a license request for a tenant. The CSP 710, 715 in turn configures its tenant with the functionality referenced in the license request. Note that, although management org 705 is hosted on host CSP 700, it uses the same APIs to deliver license requests to CSP 700 and to CSPs 710, 715.

Licensing Details

A cloud service provider such as Salesforce uses metadata to define product functionality in licenses. For example, developers for products on Salesforce's PaaS platform Force.com create metadata settings and license definitions using tools provided by Salesforce. Developers on other CSPs provide use their own tools to create the settings and license definitions.

There are two groups of licenses, according to embodiments: settings licenses and product licenses. Setting licenses define functionality at a specific level, either the platform level (controlling the functionality of an entire tenant) or the use level (controlling functionality for an individual user in the tenant). Settings licenses usually contain settings, depending on the CSP. Product licenses are collections of settings licenses (including one or more platform and/or user licenses) that together comprise a complete software product that a customer purchases. The software product license includes information about the order status (Provisioned, Pending, and so on) and the start and end dates of service.

Settings are switches, defined in metadata, that configure individual elements of product capabilities and functionality. Settings licenses usually contain settings that control functionality for an entire tenant or for users in an org, but it is possible to have a settings license without settings, e.g., licenses for Heroku do not have settings. There are two types of settings licenses: platform licenses and user licenses. Platform licenses define functionality for an entire tenant. A platform license controls the aggregate behavior of a tenant, such as whether a service like chatter or email is supported, or how much total data storage is available. User licenses define functionality for individual users in a tenant. A user license specifies a particular user role (such as standard or admin) and sets minimum and maximum permissions values, entity access, and other user capabilities. For products that include user licenses, each user in a tenant is assigned one user license which defines the baseline capabilities available for that user.

In deciding how to configure settings licenses for products, a developer considers the ways that their products define individual user entitlements versus group entitlements. CSPs configure platform and user licenses in different ways. For example, many Force.com products include platform and user licenses, with multiple settings in each. Heroku creates platform licenses but no user licenses, because its products do not define individual user entitlements. Additionally, platform licenses for Heroku do not include settings. Each Heroku license definition describes unique functionality. Heroku's product enablement model does not require the granularity of settings to define product functionality.

Each setting controls some functionality that goes into defining a feature. A license may contain one or two settings or several hundred, depending on product complexity. Settings are declared in the UDD, according to an embodiment. Every setting has a durableId and a value attribute.

Settings may include an optional Boolean editable attribute. A CSP can choose how to interpret this attribute, depending on its implementation model for the setting (for example, an editable value of true might enable a tenant admin to modify a setting to change a display or other property.) Platform settings include permissions (settings that are controlled by the provisioning system or other administrative entity, not by customers) and preferences (settings that are controlled by customers). User settings are permissions.

The examples in FIG. 8 show two user settings from a standard Salesforce User License. The first example is for data storage, with a value of 20 MB, and the example is for the default tab display, with all tabs displayed by default. This setting includes the editable attribute set to true. The CSP (e.g., Force.com) can interpret this attribute to indicate that the tenant admin can change the default tab display (as mentioned, CSPs can interpret the editable attribute in different ways, according to their individual configuration models).

Platform licenses define functionality for an entire tenant. Platform licenses include the following attributes, according to an embodiment:

fullName: the unique developer name for the license (usually the same as name)+license version number.
name: a name for the license.
cloudServiceProvider: the CSP hosting the product.

minPlatformVersion: the version of the CSP platform required to enable the product.

settingItems: metadata that defines the product functionality, as described under Settings.

settingUsageDefinitions: (optional) tracks usage of a specified resource.

The examples in FIGS. 9A, 9B and 9C show platform license definitions (.pld.xml files) from Force.com, Heroku, and Radian6 for comparison. Every license definition begins with the XML declaration that identifies the XML version number and character encoding used in the file. FIG. 9A is an example platform license definition for Custom Big Objects on the Force.com platform, with settings for PlinyCustomObjects and MaxCustomBigObjectRows. FIG. 9B is an example of a platform license definition for Heroku Scalable Dyno Hours (Heroku platform licenses do not include settings). FIG. 9C is an example of a platform license definition for Radian6 Mentions, with one setting for Mentions.

User licenses include settings that control functionality for individual users in a tenant. Generally, each user in a tenant is assigned one user license. However, each CSP can define its own licensing model, and some CSPs (like Heroku) do not create user licenses at all. User licenses include the same attributes as platform licenses (fullName, name, and so on), and one additional attribute, licenseKey: a unique identifier assigned to a license. The provisioning system uses the licenseKey to determine whether to create a new license (if none with this id exists) or to update an existing license that has this id.

FIGS. 10A and 10B are examples of user license definitions (.uld.xml files) from Force.com and Radian6. FIG. 10A is an example of a user license definition for Chatter Free 5000 from Force.com, with one setting for Seats (the ignoreQuantity attribute applies to aggregation). FIG. 10B is an example of a user license definition for Radian6 Platform Users from Radian6, with one setting for Seats.

Product licenses are bundles of settings licenses (platform and user licenses) packaged together, with a relative quantity for each. Product license definitions do not directly convey settings values. Product licenses are a marketing tool that makes it easy for customers to choose the complete suite of functionality that they need. There are two types of product licenses:

Edition licenses include at least one platform license and may include one or more user licenses. An edition license comprises the functionality required to activate a new tenant. Each tenant must have at least one edition license. (If a tenant has more than one edition license, each must be for the same edition level—for example, all Professional Edition, or all Enterprise Edition.)

Add-On licenses entitle a tenant to access additional functionality that is not included in the org's edition license. An add-on licenses can include one or more platform or user licenses. Add-on licenses are optional, and a tenant can have any number of them.

Product licenses include the following attributes, according to one embodiment:

fullName:

the unique developer name for the license (usually the same as name)+license version number.

name: a name for the license. cloudServiceProvider: the CSP hosting the product.

managementTenantId: the tenant Id. For example, the management tenant ID for Salesforce's Force.com management organization, Org 62, is 00D000000000062. (This and the following attribute are included in the event that Salesforce enables other management orgs besides Org 62.)

managementServiceProvider: the CSP that hosts the management org. For Org 62, this is Force.com.

cloudServiceProvider: the CSP that hosts the product.

includedPlatformLicenseDefinitions: identifies name and quantity of an included platform license. includedUserLicenseDefinitions: identifies name and quantity of an included user license.

An edition license includes at least one platform license and may include any number of user licenses. An edition license comprises the functionality required to activate a new tenant. For example, on Force.com, the following editions are currently available:

Professional. Designed for businesses requiring full-featured CRM functionality. It includes straightforward and easy-to-use customization, integration, and administration tools to facilitate any small to midsize deployment.

Enterprise. Meets the needs of large and complex businesses. Provides advanced customization and administration tools and access to Salesforce APIs.

Unlimited. Provides advanced levels of platform flexibility for managing and sharing information on demand. Includes all Enterprise Edition functionality, Premier Support, full mobile access, unlimited custom apps, increased storage limits, and other features.

Developer. Provides access to the Force.com platform and APIs. It lets developers extend Salesforce, integrate with other applications, and develop new tools and applications. Developer Edition also provides access to many of the features available in Enterprise Edition.

The example in FIGS. 11A and 11B is edition license definitions (.edn.xml files) from Force.com. The example edition license contains one or more platform or user licenses, set in bold type. FIGS. 11A and 11B provide an example of the Enterprise Edition license definition from Force.com contains the Custom Big Objects platform license and the Enterprise Edition platform license, and seven user licenses, including the ChatterFree5000.

Setting Up Aggregation

Aggregation is the process of calculating the combined functionality of all licenses in a license request for a customer order. Aggregation is performed during provisioning. When developers create a setting they specify an aggregation function which determines the way the setting will be aggregated. The provisioning system uses the settings values, aggregation functions, and license quantity to determine the values for the settings in the tenant. The selected management organization performs management-side aggregation for all CSPs (if the CSP has chosen to receive aggregated settings). During aggregation, the provisioning system organizes settings from all licenses in an order into settings bundles that group settings together by name. The settings bundles are in turn collected in resource groups (one for platform license settings and one for user license settings).

According to one embodiment, when setting up configuration with a management org such as Org 62, a CSP selects a checkbox on the configuration signup page, to choose whether or not to have the management org perform aggregation on the license settings for tenants on that CSP (and the CSP can perform its own tenant-side aggregation). A CSP with a simple licensing model (for example, platform licenses with no feature-level settings and no user licenses) can receive license bundles (unaggregated license metadata) from the management org. A license bundle coalesces individual licenses if all settings are the same except quantity (that is, license name, start date, and end date are the same). A CSP with platform and user licenses that both include feature-level settings can receive the aggregated settings bundles from the management org. A CSP can perform its own tenant-side aggregation, to create entities similar to the settings bundles created by the management org. For example, Force.com performs tenant-side aggregation for its tenants. (However, CSPs other than Force.com don't have access to the aggregation code on Force.com.)

The aggregationFunction attribute in a setting determines how the provisioning system performs aggregation on that setting. The aggregation Function for a setting is defined in the UDD. The following functions are defined for the aggregationFunction attribute:
  bitwiseOr: Value is the bitwise OR of all license values. (Supported only for positive integer numeric values.)
  max: Maximum value
  min: Minimum value
  newest: Value from the newest active license (the last seen by the aggregation system)
  oldest: Value from the oldest active license (the first seen by the aggregation system)
  once: There must be one and only one value in all licenses.
  same: The value must be the same in all licenses. sum: Sum of values in all licenses By default, numeric settings are aggregated as sum (total quantity for the setting in all licenses in the request), and non-numeric settings are aggregated as newest (the value from the newest active license). Developers can also define a custom function for aggregation.

Resource Groups in a License Request

The provisioning system aggregates across multiple license definitions in a license request to bundle settings into resource groups, one for platform settings and one for user settings. Resource groups designate the total value for a given setting for all licenses in the request. The provisioning system uses the license fullName attribute (for platform licenses) or the licenseKey attribute (for user licenses), along with the setting's durableId, to determine the resource group for a setting. In the license request file, the resource group data appears after the license data, and identifies the individual settings that are aggregated from all licenses in the request.

Setting up usage entitlement tracking enables service providers, customers, and the management org to track a tenant's usage of specified features, using settings attributes in platform and user licenses. Service providers can track usage to analyze how customers are using products and to charge customers by usage level. Customers can track usage in their tenants to evaluate whether they are taking full advantage of their product's capabilities, and whether they need to modify or upgrade their service. The host CSP collects usage data from its tenants and sends the data to management org using the Usage Entitlement REST API.

Usage can be tracked for any numeric setting in a setting license. To set up usage entitlement tracking, the product development team creates a data model and usage collection entities, then defines a query that will be used to collect the usage data from a tenant. According to one embodiment, developers use the isPersistentResource tag to specify how usage entitlement should be tracked. If a setting is designated as a persistent resource, usage does not accrue over time, and tracking measures only the amount being used at any given time. For example, data storage is a persistent resource. The amount of storage used at any given time is measured against the full amount allowed. If the customer uses less storage at one point, the remaining amount available increases. If a setting is a non-persistent resource, it is tracked through incremental accrual and the accrued amount used is subtracted from the full amount allowed. For example, cell phone minutes are a non-persistent resource— the more minutes a customer uses in a month, the fewer they have left.

Usage definition attributes specify how usage is tracked and charged for a setting: setting: the setting's durableId.
  isPersistentResource: Boolean, determines how usage is tracked (as described above).
  frequencyDefault: Frequency determines the duration of a single period, which is the length of time over which usage is tracked. For non-persistent resources, frequency also determines how often Amount Allowed is regranted. Frequency can be Monthly (Amount Allowed is reset once per month) or One Time (amount is purchased once at the beginning of the contract and not reset for the contract duration.)
  overageGraceDefault: percentage of Allowed Amount that customer can use without incurring an additional charge. Default value is 100% (no overage grace).

In a settings license (platform or user license), usage definition attributes are contained in a settingUsageDefinitions tag, according to one embodiment. The Radian6 Mentions platform license includes, for example, usage definitions for the setting/radian6/Mentions setting, as seen in FIG. 12.

Modifying License Settings

For embodiments in which software products are hosted on Force.com only, profiles, (i.e., permission sets), and preferences provide ways for settings values in platform and user licenses to be modified in a tenant. These modifications enable tenants to define different permissions for users who all have the same license, and to change platform settings that are designated as editable. To review the editable attribute, license settings may include an optional Boolean editable attribute, which may allow a tenant admin to modify the attribute value to change some aspect of product functionality. A CSP (in the case of profiles or permission sets, and preferences, that's Force.com only) can choose how to interpret the editable attribute, depending on its implementation model for the setting. For example, an editable value of true value might enable a tenant admin to modify a setting to change a display or other property.

A profile is a group of permission settings that modify the functionality granted by a user license. Each profile is associated with one user license, but a user license can have many different profiles associated with it. Each user in a tenant is assigned one user license, and one profile that further controls capabilities within the constraints of the user license. A profile can limit the permissions allowed by its associated user license, but can never exceed the user license permissions. Profiles usually correspond to functional roles in a tenant, such as Admin or Standard User.

Profiles (i.e., permission sets, or simply, "perm sets") provide a way to modify user permissions for a given user license type on a cloud service provider, such as Force.com. A user may assigned one or more profiles, s users can have multiple permission sets. A tenant admin may assign the same profile to a group of users, then assign a different or additional profile (permission sets) to give certain users in that group some additional access or capabilities.

A profile/permission set can be associated with one particular user license, meaning that the profile/permission set can only be assigned to users who have that license. Or, a profile/permission set may not be associated with any license (assigned to None), meaning that any user can be assigned that profile/perm set, as long as the profile/permissions don't exceed the permissions of their user license.

User licenses can have standard profiles (in which most permissions can't be edited by the tenant admin) and custom profiles (created by a tenant admin to address unique roles or requirements in the tenant.) A standard profile is identified in a license definition file with the tag, such as standardPermissionSets, with attributes for developerName (the name assigned by the developer) and profileKey (the profile name, usually the same as developerName). Each setting is tagged as settingValues, with the durableId for the setting, and a Boolean value that indicates whether the setting is enabled.

For an example of how licenses and profiles work together, FIG. 13A provides a section of the standard Salesforce User License definition for Force.com, followed by FIG. 13B which provides a section of the Admin profile (the Admin profile is one of six standard profiles included with the license definition). In the license definition section:

ActivateContract is set to false (disabled by default) and is editable.
ActivitiesAccess is enabled but has no editable tag. The setting is enabled for all users and cannot be modified by any profile.
AddDirectMessageMembers is enabled and is editable.

There are some cases in which another license with the same license key could override the editable value for a setting during aggregation, and change a non-editable setting to editable for all licenses with the same key. But, for most situations, the editable value for a setting does not change during aggregation. In the Admin profile section:

ActivateContract is set to true, so it will be enabled for users with this profile.
ActivitiesAccess (from the license) is not editable in the license, so it does not appear in this profile.
AddDirectMessageMembers is editable in the license, but it does not appear in this profile, so it is enabled for users with this profile.

For some Force.com core application user licenses, permission set licenses can extend user license permissions. In those cases, permission sets for a given user are constrained to the aggregate limits of the assigned user license and permission set license.

Preferences are platform-level settings that tenant admins can modify for platform licenses on a CSP, such as Force.com. By definition, preferences are controlled by customers, not by the provisioning system. Nonetheless, a platform license definition should include settings definitions for any available preferences, because the license definition must define all of the product's baseline functionality.

FIG. 14 provides examples of a few preferences in the Enterprise Edition platform license definition for Force.com. Preferences metadata has the same format as settings metadata, but the setting type in the durableId is orgPreference rather than userSetting.

Provisioning Details

The following discussion explains the automated provisioning system, including tenant validation and aggregation, and usage entitlement tracking after provisioning is complete, according to embodiments of the invention.

Provisioning is the process of fulfilling a customer order for a software product, enabling product functionality, and recording revenue from the purchase. The provisioning system is the automated technology managed by a selected management organization, such as Org 62, or another management org, that implements license requests to configure tenant functionality. For a product to be provisioned, it has one or more settings licenses bundled into a product license that is linked to a SKU. The provisioning process is triggered when a customer places an order through an account executive or through an application exchange (AppExchange). The automated provisioning system uses REST API operations to direct the host CSP to configure the target tenant with the functionality defined in license definitions for the products in the order, according to one embodiment. In addition, the provisioning process is triggered when a customer order expires (when the end date is the current date), to disable the expired functionality for the tenant.

The workflow of configuring functionality and tracking usage happens without human assistance. Functionality is enabled in the tenant after customer order activation. Revenue recognition is triggered when the host CSP of the tenant sends a response to the provisioning system indicating that the provisioning request was successful, and the provisioning system changes the status of the licenses in the order to Provisioned.

Figure 15:
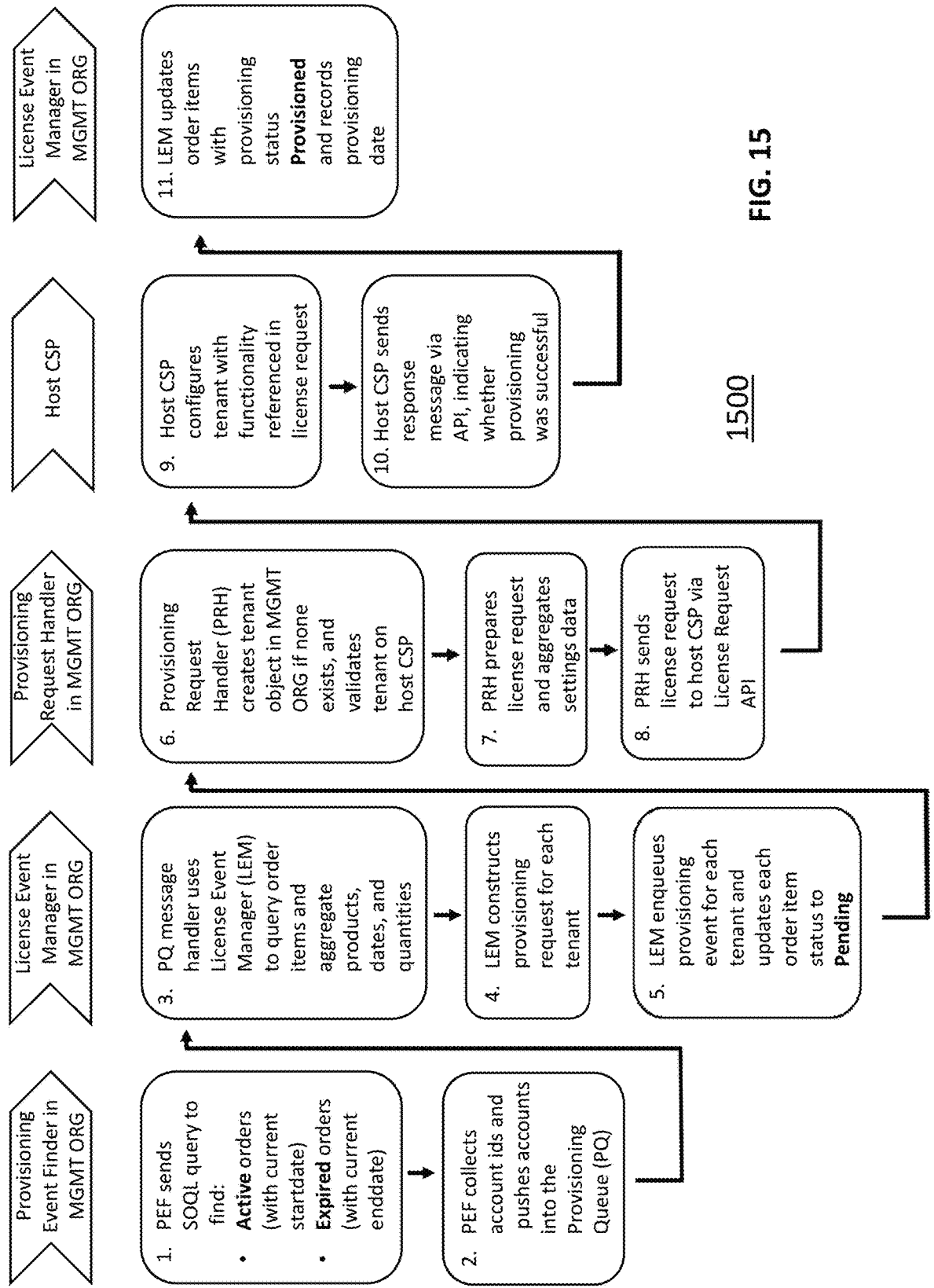
FIG. 15 is a flow diagram according to an embodiment of the invention for provisioning licensed software products in accordance with disclosed embodiments.

The provisioning system includes Apex and Java components, according to embodiments. With reference to the flow diagram 1500 in FIG. 15, according to an embodiment of the invention, as the first step in the provisioning system, a Provisioning Event Finder (PEF), an Apex job scheduler, sends a SOQL query to a management org, such as Org 62, to find orders that require provisioning, including order items in Active status (with a current start date) and Expired status (with a current end date). The PEF collects the accountIds for the associated accounts and pushes each account into the Provisioning Queue (a Java component).

The Provisioning Queue message handler uses the Licensing Event Manager (LEM, a Java component) to query the order items for each account and aggregate the products, quantities, and dates across all orders. The LEM constructs a provisioning request for each tenant. The LEM enqueues a provisioning event for each tenant with a provisioning request, and updates the status of each order item to Pending.

The Provisioning Request Handler (PRH) creates the tenant object in Org 62 (if none exists) and validates the tenant on the host CSP. The PRH prepares a license request that contain references to the product license and settings license definitions, and aggregates the settings data. The PRH uses the License Request REST API to send the license request to the host CSP for the tenant.

The host CSP configures the tenant with the product functionality referenced in the license request (the CSP should have all the information about the referenced functionality, because the CSP provided this information to L&P to create the license definitions). The host CSP sends a response message to the PRH, indicating whether the provisioning was successful.

If the provisioning was successful, the provisioning system updates the tenant record in the selected management org (e.g., Org 62) to update the status of each order item to Provisioned, with the provisioning date. (If the provisioning failed, the license request is logged and the order item status is updated to Fail.)

Regarding tenant validation, the host CSP should implement a root resource for the API, located at/licensing. The provisioning system uses this root to test authentication and verify connectivity between the provisioning system and the CSP. The provisioning system makes a HEAD request to the URL at the root of the tree, and the CSP sends a response code:

200 OK: The HEAD request was authenticated successfully.

401 Unauthorized: The HEAD request was not authenticated successfully.

Regarding tenant creation, if no tenant for the customer exists on the host CSP, the provisioning system sends a POST call to a URL. The host CSP returns a response indicating whether tenant creation was successful, with one of these response codes:

201 Created: The tenant was successfully created

200 OK: The host CSP has received duplicate tenant creation requests with the same requestId and the tenant has already been created.

400 Bad Request: The attributes in the request body are invalid, or the tenant was already created with a different request id.

401 Unauthorized: the host CSP cannot authenticate that the request.

500 Internal Server Error: An error occurred on the host CSP during the tenant creation process.

License Requests

The provisioning system queries the license definition files for the products identified by the order items. If aggregation is required, the system aggregates the settings into resource groups. The license metadata is aggregated according to the aggregation functions in the settings and the quantity value in the product licenses. If a setting has the ignoreQuantity set to true, its value will not be aggregated. Finally, the system compiles the license metadata and aggregation metadata (if needed) into a license request and sends it to the host CSP.

Implementing the License Request API

The provisioning system generates a license request and sends it to the host CSP. The license request contains a license bundle (if the host CSP does not choose to receive aggregated metadata from the selected management org) or settings bundles (if the CSP does choose to receive aggregated metadata). The system implements the license request API on the host CSP, as described:

1. The host CSP retrieves license settings from the XML or JSON in the license request and prepares the required licenses.
2. The host CSP uses the settings metadata in the license request to configure the tenant.
3. When the tenant is configured, the host CSP returns the response code 200 OK to the selected management org. The provisioning system changes the status of each order item to Provisioned, with date and time of provisioning.
4. When the status of an order item changes to Provisioned, the provisioning system updates the tenant record in the management org and records the revenue from the customer order.

Data Collection for Usage Entitlement Tracking

If usage entitlement tracking is enabled on any settings in a product, the provisioning system creates a placeholder in the tenant record on the management org and in the tenant itself, to initiate usage data collection. The provisioning system aggregates usage tracking attributes in settings as part of management-side aggregation. The CSP collects usage data from its tenants and send the data to the management org. The CSP also determines the way it will display usage data to the tenant. The data collection process are described separately below for embodiments for Force.com and embodiments for non-Force.com CSPs.

Usage Entitlement Tracking on Force.com

On Force.com, the Cloud Metrics Framework (CMF) collects usage data on a scheduled basis, usually daily. The Cloud Metrics Transmission (CMT) framework publishes the usage data to the tenant record in Org 62 and summarizes the data. Finally, the CMT publishes the summarized usage data back to the tenant. The usage data appears on the Company Info page for the tenant.

Usage Entitlement Tracking on non-Force.com CSPs

Non-Force.com CSPs use the Usage Entitlement REST API to collect and send usage entitlement data to a selected management org. The API supports both XML and JSON formats. The examples below use XML format. The host CSP sends a POST call to the management org at the following URI:

POST/<salesforce-instance-url>/services/data/{ApiVersion}/commerce/tenantusage/{serviceProviderKey}/{externalTenantId} wherein {ApiVersion} is the version of the API, {serviceProviderKey} is the service provider key for the CSP (defined during CSP configuration with the management org), and {externalTenantId} is the external tenant Id, a unique identifier for the tenant on the CSP. The example in FIG. 16 shows an XML request with usage data for Radian6 Mentions. The Required attributes in the request (all fields must include values):

usageData: UsageEntitlementUsage is the data type. setting: setting name.

amount: amount used by tenant (must be non-negative and non-zero).

startDateTime: date and time the usage measurement period began (startDateTime must not be greater than endDateTime).

endDateTime: date and time the usage measurement period ended. startDateTime and endDateTime are interpreted in the tenant time zone, and formatting must conform to this example: 2017-03-22T13:01:23.

resourceGroupKey: created during aggregation.

Each API call to report usage data should include no more than some reasonable number of records, e.g., 200 usage records, according to an embodiment. If a usage report includes more than 200 records, the CSP should send the records in multiple calls (chunks). In addition, there is a limit to the total number of API calls a tenant can make to the management org in a certain time period, e.g., a 24-hour period. (Each API call to report usage data is associated with a specific tenant). On Force.com, the limit is 15,000 calls per 24-hour period for most tenants. Each CSP system administrator should be aware of the call limits for its tenants, and ensure that those limits are not exceeded in reporting usage data.

Usage Entitlement Tracking on Non-Force.Com CSPs: Responses

If the API call to the management org is successful, the management org sends a response code, e.g., response code 201, with a response that identifies the tenant Id for which records were received. If the API call to management org is not successful, the management org sends a response code, e.g., response code 400, with an error message, e.g., the URI path includes an invalid or missing value, the amount field includes an invalid value, or the startDate is greater than the endDate, as examples.

FIG. 17A illustrates a block diagram of an environment 1798 in which an on-demand database service may operate in accordance with the described embodiments. Environment 1798 may include user systems 1712, network 1714, system 1716, processor system 1717, application platform 1718, network interface 1720, tenant data storage 1722, system data storage 1724, program code 1726, and process space 1728. In other embodiments, environment 1798 may not have all of the components listed and/or may have other elements instead of, or in addition to, those listed above.

Figure 17B:
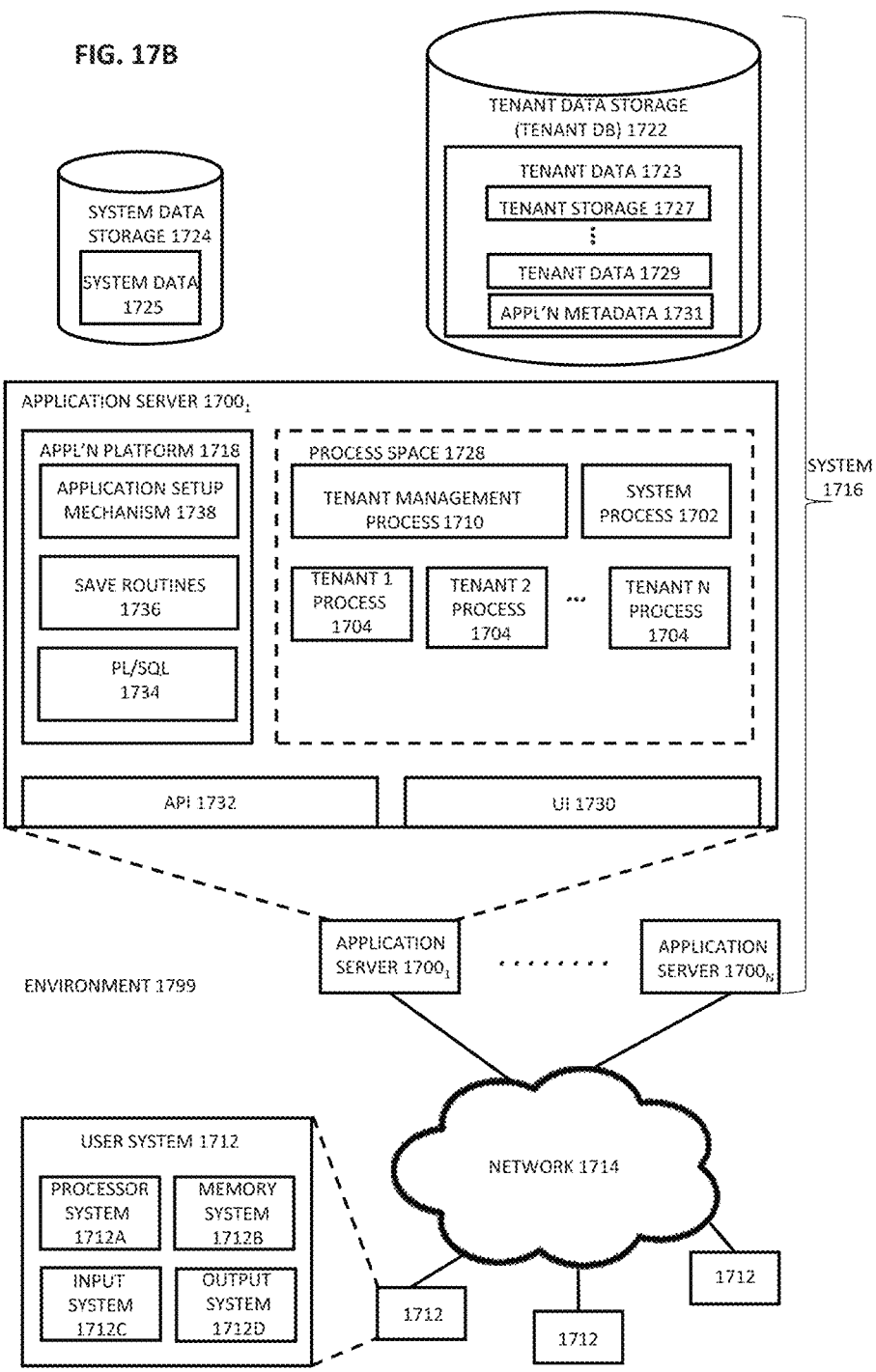
FIG. 17B illustrates another block diagram of an embodiment of elements of FIG. 17A and various possible interconnections between such elements in accordance with the described embodiments.

Environment 1798 is an environment in which an on-demand database service exists. User system 1712 may be any machine or system that is used by a user to access a database user system. For example, any of user systems 1712 can be a handheld computing device, a mobile phone, a laptop computer, a work station, and/or a network of computing devices. As illustrated in FIG. 17A (and in more detail in FIG. 17B) user systems 1712 might interact via a network 1714 with an on-demand database service, which is system 1716.

An on-demand database service, such as system 1716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1716" and "system 1716" is used interchangeably herein. A database image may include one or more database objects. A relational database management system (RDMS) or the equivalent may execute storage and retrieval of information against the database object(s). Application platform 1718 may be a framework that allows the applications of system 1716 to run, such as the hardware and/or software, e.g., the operating system. In an embodiment, on-demand database service 1716 may include an application platform 1718 that enables creation, managing and executing one or more applications developed by the provider of the on-demand database service, users accessing the on-demand database service via user systems 1712, or third party application developers accessing the on-demand database service via user systems 1712.

The users of user systems 1712 may differ in their respective capacities, and the capacity of a particular user system 1712 might be entirely determined by permissions (permission levels) for the current user. For example, where a salesperson is using a particular user system 1712 to interact with system 1716, that user system has the capacities allotted to that salesperson. However, while an administrator is using that user system to interact with system 1716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1714 is any network or combination of networks of devices that communicate with one another. For example, network 1714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 1712 might communicate with system 1716 using TCP/IP and, at a higher network level, use other common Internet protocols to communicate, such as HTTP, FTP, AFS, WAP, etc. In an example where HTTP is used, user system 1712 might include an HTTP client commonly referred to as a "browser" for sending and receiving HTTP messages to and from an HTTP server at system 1716. Such an HTTP server might be implemented as the sole network interface between system 1716 and network 1714, but other techniques might be used as well or instead. In some implementations, the interface between system 1716 and network 1714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1716, shown in FIG. 17A, implements a web-based customer relationship management (CRM) system. For example, in one embodiment, system 1716 includes application servers configured to implement and execute CRM software applications as well as provide related data, code, forms, webpages and other information to and from user systems 1712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1716 implements applications other than, or in addition to, a CRM application. For example, system 1716 may provide tenant access to multiple hosted (standard and custom) applications, including a CRM application. User (or third party developer) applications, which may or may not include CRM, may be supported by the application platform 1718, which manages creation, storage of the applications into one or more database objects and executing of the applications in a virtual machine in the process space of the system 1716.

One arrangement for elements of system 1716 is shown in FIGS. 17A and 17B, including a network interface 1720, application platform 1718, tenant data storage 1722 for tenant data 1723, system data storage 1724 for system data 1725 accessible to system 1716 and possibly multiple tenants, program code 1726 for implementing various functions of system 1716, and a process space 1728 for executing MTS system processes and tenant-specific processes, such as running applications as part of an application hosting service. Additional processes that may execute on system 1716 include database indexing processes.

Several elements in the system shown in FIG. 17A include conventional, well-known elements that are explained only briefly here. For example, each user system 1712 may include a desktop personal computer, workstation, laptop, PDA, cell phone, or any wireless access protocol (WAP) enabled device or any other computing device capable of interfacing directly or indirectly to the Internet or other network connection. User system 1712 typically runs an HTTP client, e.g., a browsing program, such as Microsoft's Internet Explorer browser, a Mozilla or Firefox browser, an Opera, or a WAP-enabled browser in the case of a smart-phone, tablet, PDA or other wireless device, or the like, allowing a user (e.g., subscriber of the multi-tenant database system) of user system 1712 to access, process and view information, pages and applications available to it from system 1716 over network 1714. Each user system 1712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1716 or other systems or servers. For example, the user interface device can be used to access data and applications hosted by system 1716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 1712 and all of its components are operator configurable using applications, such as a browser, including computer code run using a central processing unit such as an Intel Pentium® processor or the like. Similarly, system 1716 (and additional instances of an MTS, where more than one is present) and all of their components might be operator configurable using application(s) including computer code to run using a central processing unit such as processor system 1717, which may include an Intel Pentium® processor or the like, and/or multiple processor units.

According to one embodiment, each system 1716 is configured to provide webpages, forms, applications, data and media content to user (client) systems 1712 to support the access by user systems 1712 as tenants of system 1716. As such, system 1716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 17B illustrates another block diagram of an embodiment of elements of FIG. 17A and various possible interconnections between such elements in accordance with the described embodiments. FIG. 17B also illustrates environment 1799. However, in FIG. 17B, the elements of system 1716 and various interconnections in an embodiment are illustrated in further detail. More particularly, FIG. 17B shows that user system 1712 may include a processor system 1712A, memory system 1712B, input system 1712C, and output system 1712D. FIG. 17B shows network 1714 and system 1716. FIG. 17B also shows that system 1716 may include tenant data storage 1722, having therein tenant data 1723, which includes, for example, tenant storage space 1727, tenant data 1729, and application metadata 1731. System data storage 1724 is depicted as having therein system data 1725. Further depicted within the expanded detail of application servers $1700_{1-N}$ are User Interface (UI) 1730, Application Program Interface (API) 1732, application platform 1718 includes PL/SOQL 1734, save routines 1736, application setup mechanism 1738, process space 1728 includes system process space 1702, tenant 1-N process spaces 1704, and tenant management process space 1710. In other embodiments, environment 1799 may not have the same elements as those listed above and/or may have other elements instead of, or in addition to, those listed above.

User system 1712, network 1714, system 1716, tenant data storage 1722, and system data storage 1724 were discussed above in FIG. 17A. As shown by FIG. 17B, system 1716 may include a network interface 1720 (of FIG. 17A) implemented as a set of HTTP application servers 1700, an application platform 1718, tenant data storage 1722, and system data storage 1724. Also shown is system process space 1702, including individual tenant process spaces 1704 and a tenant management process space 1710. Each application server 1700 may be configured to tenant data storage 1722 and the tenant data 1723 therein, and system data storage 1724 and the system data 1725 therein to serve requests of user systems 1712. The tenant data 1723 might be divided into individual tenant storage areas (e.g., tenant storage space 1727), which can be either a physical arrangement and/or a logical arrangement of data. Within each tenant storage space 1727, tenant data 1729, and application metadata 1731 might be similarly allocated for each user. For example, a copy of a user's most recently used (MRU) items might be stored to tenant data 1729. Similarly, a copy of MRU items for an entire organization that is a tenant might be stored to tenant storage space 1727. A UI 1730 provides a user interface and an API 1732 provides an application programmer interface into system 1716 resident processes to users and/or developers at user systems 1712. The tenant data and the system data may be stored in various databases, such as one or more Oracle™ databases.

Application platform 1718 includes an application setup mechanism 1738 that supports application developers' creation and management of applications, which may be saved as metadata into tenant data storage 1722 by save routines 1736 for execution by subscribers as one or more tenant process spaces 1704 managed by tenant management process space 1710 for example. Invocations to such applications may be coded using PL/SOQL 1734 that provides a programming language style interface extension to API 1732. Invocations to applications may be detected by one or more system processes, which manages retrieving application metadata 1731 for the subscriber making the invocation and executing the metadata as an application in a virtual machine.

Each application server 1700 may be communicably coupled to database systems, e.g., having access to system data 1725 and tenant data 1723, via a different network connection. For example, one application server $1700_1$ might be coupled via the network 1714 (e.g., the Internet), another application server $1700_{N-1}$ might be coupled via a direct network link, and another application server $1700_N$ might be coupled by yet a different network connection. Transfer Control Protocol and Internet Protocol (TCP/IP)

are typical protocols for communicating between application servers 1700 and the database system. However, it will be apparent to one skilled in the art that other transport protocols may be used to optimize the system depending on the network interconnect used.

In certain embodiments, each application server 1700 is configured to handle requests for any user associated with any organization that is a tenant. Because it is desirable to be able to add and remove application servers from the server pool at any time for any reason, there is preferably no server affinity for a user and/or organization to a specific application server 1700. In one embodiment, therefore, an interface system implementing a load balancing function (e.g., an F5 Big-IP load balancer) is communicably coupled between the application servers 1700 and the user systems 1712 to distribute requests to the application servers 1700. In one embodiment, the load balancer uses a least connections algorithm to route user requests to the application servers 1700. Other examples of load balancing algorithms, such as round robin and observed response time, also can be used. For example, in certain embodiments, three consecutive requests from the same user may hit three different application servers 1700, and three requests from different users may hit the same application server 1700. In this manner, system 1716 is multi-tenant, in which system 1716 handles storage of, and access to, different objects, data and applications across disparate users and organizations.

As an example of storage, one tenant might be a company that employs a sales force where each salesperson uses system 1716 to manage their sales process. Thus, a user might maintain contact data, leads data, customer follow-up data, performance data, goals and progress data, etc., all applicable to that user's personal sales process (e.g., in tenant data storage 1722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1716 might also maintain system level data usable by multiple tenants or other data. Such system level data might include industry reports, news, postings, and the like that are sharable among tenants.

In certain embodiments, user systems 1712 (which may be client systems) communicate with application servers 1700 to request and update system-level and tenant-level data from system 1716 that may require sending one or more queries to tenant data storage 1722 and/or system data storage 1724. System 1716 (e.g., an application server 1700 in system 1716) automatically generates one or more SQL statements (e.g., one or more SQL queries) that are designed to access the desired information. System data storage 1724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 18 illustrates a diagrammatic representation of a machine 1800 in the exemplary form of a computer system, in accordance with one embodiment, within which a set of instructions, for causing the machine/computer system 1800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1800 includes a processor 1802, a main memory 1804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1818 (e.g., a persistent storage device including hard disk drives and a persistent database and/or a multi-tenant database implementation), which communicate with each other via a bus 1830. Main memory 1804 includes a web services bridge 1824 and a schema interface 1825 and a parser 1823 by which to communicate with another web services platform, retrieve, and parse a schema to identify methods provided by the web service at the other web services platform in accordance with described embodiments. Main memory 1804 and its sub-elements are operable in conjunction with processing logic 1826 and processor 1802 to perform the methodologies discussed herein.

Processor 1802 represents one or more general-purpose processing devices such as a microprocessor, central processing unit, or the like. More particularly, the processor 1802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1802 may also be one or more special-purpose processing devices such as an application specific integrated circuit (ASIC), a field programmable gate array (FPGA), a digital signal processor (DSP), network processor, or the like. Processor 1802 is configured to execute the processing logic 1826 for performing the operations and functionality which is discussed herein.

The computer system 1800 may further include a network interface card 1808. The computer system 1800 also may include a user interface 1810 (such as a video display unit, a liquid crystal display, etc.), an alphanumeric input device 1812 (e.g., a keyboard), a cursor control device 1814 (e.g., a mouse), and a signal generation device 1816 (e.g., an integrated speaker). The computer system 1800 may further include peripheral device 1836 (e.g., wireless or wired communication devices, memory devices, storage devices, audio processing devices, video processing devices, etc.).

The secondary memory 1818 may include a non-transitory machine-readable storage medium or a non-transitory computer readable storage medium or a non-transitory machine-accessible storage medium 1831 on which is stored one or more sets of instructions (e.g., software 1822) embodying any one or more of the methodologies or functions described herein. The software 1822 may also reside, completely or at least partially, within the main memory 1804 and/or within the processor 1802 during execution thereof by the computer system 1800, the main memory 1804 and the processor 1802 also constituting machine-readable storage media. The software 1822 may further be transmitted or received over a network 1820 via the network interface card 1808.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. Non-transitory computer readable storage media having instructions stored thereupon that, when executed by a processor of a system of a host organization having at least a processor and a memory therein, the instructions cause the system to perform operations comprising:

executing instructions via the processor configurable to cause the system to operate a request interface on behalf of a plurality of tenants of the host organization, wherein the host organization stores information on behalf of the plurality of tenants;

communicably linking the host organization with a third-party cloud-service-provider (CSP) via a provisioning API, wherein the third-party CSP provides features of a software product available for licensing through the host organization;

receiving, at the request interface of the host organization, user input defining the features of the software product to be licensed from the third-party CSP;

executing instructions at the system of the host organization for creating the new license definition of the software product based on one or more of the features defined by the user input by creating a plurality of platform license definitions that define functionality of the software product;

creating license definitions specific to a user that define functionality of the software product for the user;

combining the license definitions for the user with the platform license definitions to form a settings bundle of aggregated settings for the user defining the license definitions specific to the user and the platform license definitions applicable to the user;

transmitting a license request to the third-party CSP via the provisioning API and storing the settings bundle into a software application depot hosted by the third-party CSP; and assigning and linking a stock keeping unit (SKU) to the license definition to make the software product available for purchase to the user.

2. The non-transitory computer readable storage media of claim 1, further comprising:

receiving from a tenant organization an order for the software product at the selected management organization, the order specifying the SKU;

determining the user input is not associated with any of the plurality of tenants of the host organization and responsively creating a new tenant within the host organization to be associated with a new license definition; and wherein creating the new license definition of the software product comprises creating the new license definition of the software product for the new tenant having originated the user input received by the host organization.

3. The non-transitory computer readable storage media of claim 1:

wherein transmitting the license request to the third-party CSP via the provisioning API, further comprises generating the license request with a reference to the license definitions for the user with the platform license definitions for the ordered software product to be purchased by the user; and wherein the method further comprises:

publishing a record for the license definition in a selected management organization for the cloud computing service provider, the record providing the reference to the license definitions for the user with the platform license definitions and an owner for the license definitions.

4. The non-transitory computer readable storage media of claim 3, further comprising transmitting the license request to a cloud service provider that hosts the tenant organization.

5. The non-transitory computer readable storage media of claim 4, further comprising writing a license for the ordered software product to the tenant organization.

6. The non-transitory computer readable storage media of claim 5, further comprising configuring the software product for the tenant organization in accordance with the written license.

7. A system to execute within a host organization, wherein the system comprises:
a memory to store instructions;
a set of one or more processors;
a non-transitory machine-readable storage medium that provides instructions that, when executed by the set of one or more processors, the instructions stored in the memory are configurable to cause the system to perform operations comprising:
executing instructions via the processor configurable to cause the system to operate a request interface on behalf of a plurality of tenants of the host organization, wherein the host organization stores information on behalf of the plurality of tenants;
communicably linking the host organization with a third-party cloud-service-provider (CSP) via a provisioning API, wherein the third-party CSP provides features of a software product available for licensing through the host organization;
receiving, at the request interface of the host organization, user input defining the features of the software product to be licensed from the third-party CSP;
executing instructions at the system of the host organization for creating the new license definition of the software product based on one or more of the features defined by the user input by creating platform license definitions that define functionality of the software product;
creating license definitions specific to a user that define functionality of the software product for the user;
combining the license definitions for the user with the platform license definitions to form a settings bundle of aggregated settings for the user defining the license definitions specific to the user and the platform license definitions applicable to the user;
transmitting a license request to the third-party CSP via the provisioning API and storing the settings bundle into a software application depot hosted by the third-party CSP; and
assigning and linking a stock keeping unit (SKU) to the license definition to make the software product available for purchase to the user.

8. The system of claim 7, wherein the instructions stored in the memory are configurable to cause the system to perform operations further comprising:
receiving from a tenant organization an order for the software product at the selected management organization, the order specifying the SKU;
determining the user input is not associated with any of the plurality of tenants of the host organization and responsively creating a new tenant within the host organization to be associated with a new license definition; and
wherein creating the new license definition of the software product comprises creating the new license definition of the software product for the new tenant having originated the user input received by the host organization.

9. The system of claim 7:
wherein transmitting the license request to the third-party CSP via the provisioning API, further comprises generating the license request with a reference to the license definitions for the user with the platform license definitions for the software product to be purchased by the user; and
wherein the method further comprises:
publishing a record for the license definition in a selected management organization for the cloud computing service provider, the record providing the reference to the license definitions for the user with the platform license definitions and an owner for the license definitions.

10. The system of claim 9, wherein the instructions stored in the memory are configurable to cause the system to perform operations further comprising:
transmitting the license request to a cloud service provider that hosts the tenant organization.

11. The system of claim 10, wherein the instructions stored in the memory are configurable to cause the system to perform operations further comprising:
writing a license for the ordered software product to the tenant organization.

12. The system of claim 11, wherein the instructions stored in the memory are configurable to cause the system to perform operations further comprising:
configuring the software product for the tenant organization in accordance with the written license.

13. A method performed by a system of a host organization, the system having at least a processor and a memory therein to execute instructions, wherein the method comprises:
executing instructions via the processor configurable to cause the system to operate a request interface on behalf of a plurality of tenants of the host organization, wherein the host organization stores information on behalf of the plurality of tenants;
communicably linking the host organization with a third-party cloud-service-provider (CSP) via a provisioning API, wherein the third-party CSP provides features of a software product available for licensing through the host organization;
receiving, at the request interface of the host organization, user input defining the features of the software product to be licensed from the third-party CSP;
executing instructions at the system of the host organization for creating the new license definition of the software product based on one or more of the features defined by the user input by creating platform license definitions that define functionality of the software product;
creating license definitions specific to a user that define functionality of the software product for the user;
combining the license definitions for the user with the platform license definitions to form a settings bundle of aggregated settings for the user defining the license definitions specific to the user and the platform license definitions applicable to the user;

transmitting a license request to the third-party CSP via the provisioning API and storing the settings bundle into a software application depot hosted by the third-party CSP; and assigning and linking a stock keeping unit (SKU) to the license definition to make the software product available for purchase to the user.

14. The method of claim 13, further comprising:

receiving from a tenant organization an order for the software product at the selected management organization, the order specifying the SKU;

determining the user input is not associated with any of the plurality of tenants of the host organization and responsively creating a new tenant within the host organization to be associated with a new license definition; and wherein creating the new license definition of the software product comprises creating the new license definition of the software product for the new tenant having originated the user input received by the host organization.

15. The method of claim 13:

wherein transmitting the license request to the third-party CSP via the provisioning API, further comprises generating the license request with a reference to the license definitions for the user with the platform license definitions for the software product to be purchased by the user; and wherein the method further comprises:

publishing a record for the license definition in a selected management organization for the cloud computing service provider, the record providing the reference to the license definitions for the user with the platform license definitions and an owner for the license definitions.

16. The method of claim 15, further comprising:

transmitting the license request to a cloud service provider that hosts the tenant organization.

17. The method of claim 16, further comprising:

writing a license for the ordered software product to the tenant organization.

18. The method of claim 17, further comprising:

configuring the software product for the tenant organization in accordance with the written license.

* * * * *